United States Patent [19]

Peignier et al.

[11] Patent Number: 4,894,335

[45] Date of Patent: Jan. 16, 1990

[54] OIL-IN-WATER EMULSIONS CONTAINING HETEROPOLYSACCHARIDE BIOPOLYMERS

[75] Inventors: Michel Peignier, Versailles; Michel Garcia, Antony; Alain Senechal, Maisons-Alfort; Pierre Gagne, Tassin-la-Demi Lune; Dominique Lespinasse, Jassans Riottier; Jean-Bernard Chaux, Tassin-la-Demi-Lune, all of France

[73] Assignee: Rhone-Poulenc Specialites Chimiques, Courbevoie, France

[21] Appl. No.: 26,188

[22] Filed: Mar. 16, 1987

Related U.S. Application Data

[63] Continuation of Ser. No. 627,674, Jul. 5, 1984, abandoned.

[30] Foreign Application Priority Data

Jul. 4, 1983 [JP] Japan .................................. 58-11060

[51] Int. Cl.$^4$ ....................... C12P 19/06; E21B 43/16; C09K 3/00; C10G 32/00
[52] U.S. Cl. ..................................... 435/104; 166/275; 252/8.511; 252/8.554; 435/183; 435/266; 435/281
[58] Field of Search .................. 426/19, 602; 435/104, 435/266, 183, 281; 252/8.55 D, 306, 8.511, 8.554; 166/246, 275

[56] References Cited

U.S. PATENT DOCUMENTS

| | | | |
|---|---|---|---|
| 3,305,016 | 2/1967 | Lindblom et al. | 166/246 |
| 3,719,606 | 3/1973 | Froning et al. | 166/275 X |
| 4,271,907 | 6/1981 | Gale | 252/8.55 D X |
| 4,299,825 | 11/1981 | Lee | 435/64 X |
| 4,352,882 | 10/1982 | Maury | 435/104 X |
| 4,412,925 | 11/1983 | Ballerini et al. | 166/246 X |
| 4,534,411 | 8/1985 | Morita et al. | 252/8.55 D X |
| 4,537,253 | 8/1985 | Morita et al. | 252/855 D X |

FOREIGN PATENT DOCUMENTS 49012  7/1982  European Pat. Off. ............ 435/104

Primary Examiner—David M. Naff
Attorney, Agent, or Firm—Burns, Doane, Swecker & Mathis

[57] ABSTRACT

Stable oil-in-water emulsions are prepared containing a relatively high concentration of from 8 to 60% by weight of a heteropolysaccharide bipolymer, e.g., xanthan gum preferably, the emulsions contain greater than 15 up to 60% biopolymer, 40 to 99 parts of an aqueous phase containing 10 to 60% by weight biopolymer and 40% to 90% by weight water, 1 to 60 parts oil and 1 to 40% with respect to the aqueous phase and oil of a surface active agent. The emulsions are prepared by combining powdered biopolymer with water, oil and surfactant or by concentrating an oil-in-water emulsion containing the biopolymer such as by ultrafiltration. A fermentation wort containing the biopolymer may be used in preparing the emulsion.

16 Claims, No Drawings

OIL-IN-WATER EMULSIONS CONTAINING HETEROPOLYSACCHARIDE BIOPOLYMERS

This application is a continuation of application Ser. No. 627,674, filed July 5, 1984, now abandoned.

BACKGROUND OF THE INVENTION

1. Field of the Invention:

The present invention relates to biopolymer-based compositions, and, more especially, to stable oil-in-water emulsions having high concentrations in biopolymers, and to processes for the preparation and use thereof.

2. Description of the Prior Art

Biopolymers or biogums are defined as heteropolysaccharides of microbial origin obtained by the fermentation of a carbohydrate assimilable by appropriate microorganism. The most representative example of such biopolymers is xanthan gum. By virtue of their thickening properties and their rheology, heteropolysaccharides have found various applications, in particular in the field of foods and in the construction, paint, paper, textile, cosmetic, and phytosanitary industries, in the treatment of waters and the petroleum industry, for example, in drilling and the assisted recovery of oil.

For numerous applications it is necessary to constitute the biopolymer in the form of a low concentration aqueous solution. It is known that the major disadvantage of biogum powders is the difficulty in dissolving them rapidly without agitation with a high shear effect, which could cause a degradation of certain properties. For applications which do not require a high purity polymer, it would be possible to use the fermentation wort directly, but the cost of transporation is an obstacle to the commercial development of such products.

In order to increase the dispersibility of xanthan gum and to facilitate its use, highly concentrated polymer compositions have already been proposed. Thus, European Patent No. 016,640 describes "slurries" of xanthan gum in a hydrophobic solvent containing a suspension agent. These suspensions are prepared from polymer powders.

SUMMARY OF THE INVENTION

The major object of the present invention is the provision of novel compositions having relatively high biopolymer concentrations that are pumpable, storage stable, and permit rapid dissolution at an industrial site.

Another object of this invention is the provision of novel compositions having high biopolymer concentrations without the necessity of proceeding through the intermediate stage of obtaining a powder from the fermentation wort.

Yet another object of the invention is the provision of novel compositions which, by dilution in an aqueous medium, yield nonclogging solutions to be used primarily in the assisted recovery of oil.

Briefly, the biopolymer compositions according to the invention comprise a stable oil-in-water emulsion containing 8 to 60% of the polymer, expressed as % by weight of dry solids with respect to the total weight of the emulsion.

DETAILED DESCRIPTION OF THE INVENTION

More particularly according to the present invention, the subject emulsions preferably contain the biopolymer in amounts greater than 15% by weight.

The emulsions according to the invention further comprise, by weight:

(i) 40 to 99 parts of an aqueous phase containing 10 to 60% by weight biopolymer and 40 to 90% by weight water;

(ii) 1 to 60 parts of an oil; and (iii) 1 to 40% with respect to the mixture of (i)+(ii) of at least one surface active agent.

The aqueous phase may consist of pure water, deionized water or tap water containing mineral ions in varying proportion.

As mentioned above, the biopolymer is a high molecular weight heteropolysaccharide obtained by the fermentation of a carbohydrate by the action of microorganisms. Numerous species of microorganisms are capable of producing hydrophilic gums. In general, all heteropolysaccharides having hydrophilic, pseudoplastic and viscosifying properties and which are products of fermentation may be used in the emulsions of the present invention. Exemplary of such microorganisms, the following are representative: bacteria of the genus Xanthomonas, Arthrobacter or Azotobacter. Experience has shown that certain species are capable of producing polymers with notable efficiency. The species *Xanthomonas begoniae, Xanthomonas campestris, Xanthomonas incanae* and *Xanthomonas pisi* are especially noted in this respect for the synthesis of heteropolysaccharides.

Xanthan gum is the biopolymer produced by the species *Xanthomonas campestris*. Its molecular weight is higher than $10^6$ It contains in its native state D-glucose, D-mannose, D-glucuronate units, 0-acetyl and pyruvate radicals. The preparation of xanthan gum is described in numerous publications and patents, for example, U.S. Pat. Nos. 3,020,206, 3,391,06 and 4,154,654.

Upon completion of the fermentation process and the production of the polysaccharide, the fermentation wort contains approximately 15 to 30 g/liter biopolymer. It may be advantageous to subject the fermented wort to appropriate heat treatment, for example, at a temperature of from 80 to 130° C. for approximately 10 min to 1 hour (U.S. Pat. No. 3,591,578). The biopolymer may be recovered from the wort by precipitation with the aid of a precipitating agent, generally isopropanol, filtration and drying. The wort or a solution of the biopolymer reconstituted from the powder may be optionally subjected to purifying operations, such as centrifugation, filtration over diatomaceous earths, enzyme action or any other method known to this art. The emulsions according to the invention and the processes for their preparation apply both to polysaccharides in their native state and to deacetylated (U.S. Pat. No. 3,054,689), pyruvate-free (U.S. Pat. No. 4,340,678) polysaccharides modified by heating in an alkaline medium (U.S. Pat. No. 3,964,972) or by any other known method.

The oil phase is a hydrophobic liquid, immiscible or slightly miscible with water (solubility equal to or less than 1% at 20° C.). Exemplary of materials constituting such oil phase aliphatic hydrocarbons preferably having less than 8 carbon atoms, aromatic hydrocarbons, esters of at least $C_6$ heavy alcohols, are representative. The hydrocarbons are usually available in the form of complex mixtures, e.g., dearomatized aliphatic hydrocarbon fractions, isoparaffin mixtures, kerosene, petroleum distillation fractions. Vegetable oils, such as corn oil, peanut oil, soy bean oil, and the like, may also be used advantageously in certain applications.

The dispersion and stabilization of the oil phase in the aqueous phase are obtained by means of a surface active agent, the HLB value of which being selected as a function of the oil used and the application intended. Surface active agents are defined as compounds, the chemical structure of which comprises both a hydrophilic moiety and a lipophilic moiety. The surface active agent may be nonionic, anionic, cationic or amphoteric, but preferably it is nonionic or anionic.

For selection of suitable surface active agents, reference is made, among others, to Kirk Othmer, *Encyclopedia of Chemical Technology*, volume 19 or to the Surfactant Series, published by Marcel Dekker: Non-Ionic Surfactants, Vol. I, Schick—Cationic Surfactants, Vol. IV, Jungerman—Anionic Surfactants, Vol. VII, Linfield.

Representative anionic surface active agents include, for example, alkaline salts of carboxylic acids, sulfonates, such as alkyl and/or arylsulfonates, sulfosuccinates, sulfates and sulfate products, such as alkyl sulfates, alcohol sulfates, polyglycol sulfate ethers, phosphate derivatives, such as alcohol ethoxy phosphates.

Exemplary of the cationic surfactants are, for example ethoxy-mono, di- and polyamines, ethoxy amideamines, and quaternary ethoxyammonium salts.

Exemplary of the nonionic surfactants are, e.g., those compounds typically prepared by the condensation of alkylene oxide with an aliphatic or alkylaromatic organic compound. Representative such surfactants are polyoxyethylene alkylphenols, polyoxyethylene alcohols, polyoxyethylene fatty acids, polyoxyethylene triglycerides, polyoxyethylene and polyoxypropylene derivatives. In this class of surfactants, preferred are the condensation products of nonylphenol and ethylene oxide containing an average of 4 to 16 moles ethylene oxide and the condensation products of aliphatic alcohols having 8 to 18 carbon atoms with ethylene oxide containing an average of 2 to 16 moles ethylene oxide.

All of the aforesaid surfactants may be used either alone or in mixtures thereof. All or a portion of the surfactant, depending upon its nature, may be introduced into the oil or into the water.

Stable emulsions may be obtained through the use of the different components in the aforementioned proportions by weight, by appropriately selecting the surfactant or surfactants as a function of the oil employed. The amount of surfactant required is easily determined by routine experimentation. It has been determined that especially suitable emulsions comprise 20 to 30 parts of xanthan gum, 30 to 50 parts water, 25 to 40 parts aromatic or aliphatic hydrocarbons and 4 to 10 parts surfactant.

The preparation of the emulsions according to the invention may be effected from a powder of the biopolymer or an aqueous solution typically containing from 1 to approximately 15-18% of the biopolymer. It will be appreciated, however, that these concentrations are not limitations upon the invention.

According to one embodiment of the invention, the emulsion is prepared from powder. It is then possible to initially prepare an emulsion of oil in water by introducing, under agitation, the water into the oil containing the surfactant or surfactants, then slowly adding the biopolymer while maintaining the agitation. Alternatively, it is possible to mix the surfactant into the solvent, then disperse the polymer powder in the solvent under adequate agitation and finally to add the water continuously, while maintaining strong agitation.

According to a second embodiment of the invention, the emulsion is prepared from a dilute aqueous solution of the biopolymer. The preparation process is then characterized in that:

(a) an oil-in-water emulsion is prepared by the addition of an oil and a surfactant to an aqueous solution containing 1 to approximately 18% by weight biopolymer in an oil/water ratio ranging from approximately 1/100 to 2/1;

(b) the emulsion is concentrated by eliminating the water by any known means until an emulsion is obtained containing 10 to 60% polymer in the aqueous phase.

The water may be eliminated, for example, by evaporation distillation, optionally under reduced pressure. It is possible to eliminate part of the oil phase in an azeotropic or nonazeotropic mixture with the water. It is also possible to employ ultrafiltration using conventional hydrophilic membranes.

In an especially advantageous embodiment of the invention, the emulsion is prepared from a fermentation wort. It is possible in this case to utilize a raw wort, a clarified wort or a preconcentrated wort.

The preconcentration of the raw or clarified wort may be effected by any conventional means, for example, by evaporation or ultrafiltration, with the latter method being preferred on an industrial scale, as it permits, in a manner in and of itself known to the art, the separation of the low molecular weight molecules from the high molecular weight molecules and the concentration of the polymers without any loss in their rheological properties. After or prior to concentration, the wort may be freed of its impurities by filtration and/or by enzymatic treatment. The raw wort generally contains 15 to 30 g/liter of the biopolymer. By ultrafiltration, the concentration of the wort may be increased to approximately 150–180 g/liter.

In a preferred embodiment of the invention, the emulsion is prepared from a raw fermentation wort and is subsequently concentrated by ultrafiltration using conventional methods and apparatus, with the obvious condition that a porous, hydrophilic membrane is to be selected, the pores of which being sufficiently small to prevent the passage of the biopolymer through the membrane.

Ultrafiltration assures the preservation of the emulsions in a continuous aqueous phase. Concentration by ultrafiltration has the further advantage of maintaining the mineral salt content of the aqueous phase at values close to those present in the original wort, regardless of the polymer content.

In another embodiment of the invention, it is possible to concentrate the emulsion first by ultrafiltration and then by another operation, for example, evaporation or distillation.

Without departing from the scope of this invention, the emulsions may further contain bactericides, enzymes or any other additive with a view towards any particular application, provided that said additive does not impair the stability of the emulsion.

The oil-in-water emulsions according to the invention are useful in all applications requiring viscous aqueous fluids. They offer the advantage that they may be used directly for the preparation of dilute aqueous solutions without having to proceed through an inversion phase. They disperse very well in water, the speed of dissolution being at least equal to that of the original wort. They remain pumpable and stable over a very wide range of concentrations. Their viscosity is substantially less than that of an aqueous solution containing an equivalent amount of biopolymer, so that it is possible to have flowable or pumpable emulsions having high polysaccharide concentrations in the aqueous phase. After dilution, the rheological characteristics of the low concentration aqueous solutions are at least equal to those of the initial wort.

In view of all of these advantages, the emulsions of the invention are especially suitable for oil field use and for the formulation of aqueous solutions intended for the assisted recovery of petroleum.

In order to further illustrate the present invention and the advantages thereof, the following specific examples are given, it being understood that same are intended only as illustrative and in nowise limitative.

EXAMPLE 1:

The following materials were charged into a reactor equipped with an agitator system rotating at 1,000 rpm: 395 g Solvesso 200 (a mixture of aromatic hydrocarbons marketed by Esso Chimie), then 20 g tristyrylphenoloxyethylene, 20 g calcium dodecylbenzene sulfonate and 15 g alkylarylphenoloxyethylene (trademarks Soprophor S 25, Soprophor 70, Soprophor 70, Soprophor 3 D 33, of Rhone-Poulenc Co.)

Following the dissolution of the emulsifying system, 250 g of xanthan gum is added in powder form (trademark Rhodopol 23, marketed by the Rhone-Poulenc Co.).

| Particle dimensions: | less than 200 μm | 77.5% |
| | between 200-250 μm | 14% |
| | larger than 250 μm | 8.5% |

After the powder had been well dispersed in the solvent, continuously under agitation over 15 min, 300 g water were introduced.

A highly homogeneous oil-in-water emulsion was obtained which exhibited no phase separation after 20 days of standing at ambient temperature.

From this emulsion, a 0.3% aqueous solution of xanthan gum was prepared. The viscosity of the sol obtained was measured and compared to that of a sol of the same concentration (control) prepared from Rhodopol powder.

The conditions for preparation of the sols were as follows:

For each experiment 400 g of sol were prepared,
 (i) in a beaker equipped with an agitator system rotating at 500 rpm, 400 g tap water were introduced,
 (ii) the composition or the powder were rapidly poured therein, in the amount desired, the duration of the addition being less than 30 sec,
 (iii) agitation was continue 1 min after the completion of the introduction.

Viscosity was measured at 23° C. by means of Brookfield viscosimeter, model RTV, needle No. 2, rotating at a speed of 10 rpm.

Measurements were effected after 10, 30, 60 min, and then after 24 hours of standing.

| Duration of Agitation | Viscosity in Mpa.S | |
| --- | --- | --- |
| | Ex. 1 | Control |
| 10 min | 220 | 110 |
| 30 min | 540 | 320 |
| 60 min | 740 | 560 |
| 24 hours | 860 | 740 |

EXAMPLE 2:

The same materials were used as in Example 1, but the operation was carried out as follows:

The emulsifiers were added to the Solvesso. After dissolution, the water was slowly added, under agitation, followed by introduction of the xanthan gum powder.

A stable emulsion was obtained; no phase separation was noted after 20 days of standing.

EXAMPLE 3:

Into a reactor equipped with an agitator and a thermostatic bath, 500 g of a raw fermentation wort, concentrated by ultrafiltration to a content of 7.6% xanthan gum, were introduced.

Under agitation (500 rpm), 74.5 g of the following mixture were introduced:

(i) Solvesso 200: 67 g ii) Soprophor 70: 2.75 g iii) Soprophor S 25: 2.75 g (iv) Soprophor 3 D 33: 2 g Agitation was maintained for 10 min, then the reactor was placed under a partial vacuum 20 000-21 000 Pa) and the temperature was raised to 80°-85° C. This evaporation phase was continued for 3 hours.

An emulsion with a continuous aqueous phase was obtained, having the following composition by weight:
 (1) Xanthan gum: 23%
 (2) Water: 44%
 (3) Oil: 28.5%
 (4) Surfactant: 4.5%

This emulsion was homogeneous and pourable. No phase separation was observed after storage for 1 month at ambient temperature. The change in viscosity was measured as a function of velocity gradients comparing a 2% xanthan gum sol (Rhodopol 23) prepared by the dissolution of the powder in tap water and the initial wort. The results are reported in Table I.

The rheology of solutions with different concentrations prepared from the emulsion was tested in the Rheomat and compared with that of solutions having the same concentration prepared from the initial wort.

For each concentration, a rheogram plotted 24 hours after completion of the preparation makes it possible to:
 (a) calculate the critical stress at the threshold of flow;
 (b) calculate the apparent viscosity at different velocity gradients; and
 (c) evaluate pseudoplasticity.

The results are reported in Table II. The same measurements carried out after 10 days of storage at 23° C. gave identical results.

Compared to the initial wort, improved performance of the emulsion is noted with respect to the flow threshold and viscosity, regardless of the concentration of the solutions. In all cases, pseudoplasticity increased as the concentration of the sols increased.

A comparative examination of solutions prepared in tap water and in ion-containing water evidenced a favorable effect on the flow threshold and the viscosity with use of the ion-containing water, while the pseudoplastic behavior remained identical.

EXAMPLE 4:

In the same manner as in Example 3, an oil/water emulsion was prepared from:
 (i) 500 g xanthan gum wort containing 7.8% dry solids;
 (ii) 60 g Solvesso 200;
 (iii) 7.5 g Cemulsol LA 20 (ethoxylauryl alcohol. Trademark of the SFOS Co.);
 (iv) 7.5 g of Cemulsol LA 20 (polyethoxy nonylphenol. Trademark of the SFOS Co.).

After evaporation/concentration, an emulsion having the following composition by weight was obtained:
 (1) Xanthan gum: 22.3%
 (2) Water: 40.5%
 (3) Oil: 28.6%
 (4) Surfactants: 8.6%

EXAMPLE 5:

An emulsion was prepared in the manner as in Example 3, using:
 (i) for the aqueous phase, a fermentation wort having 7.8% by weight of xanthan gum;
 (ii) for the oil phase;
 (a) 11 g Exsol D 100 (dearomatized aliphatic hydrocarbons, Esso Chimie—d=0.805);
 (b) 1 g Cemulsol PA 20; and
 (c) 1 g Cemulsol PA 17 (alkylpolyetherphosphate, SFOS Co.).

After concentration by evaporation (70° C.—under 20 000–21 500 Pa), the final emulsion had the following composition:
 (1) Xanthan gum: 25 2%
 (2) Water: 29.0%
 (3) Oil: 38.1%
 (4) Emulsifiers: 7.7%

The rheology and the filterability of dilute aqueous solutions prepared from the above solution, on the one hand, and from the wort used to prepare the emulsion (control) on the other:

Rheology: The emulsion (or the wort) was diluted in saline water (50 g/l NaCl and 5 g/l CaCl$_2$) to obtain a solution containing 1,000 ppm xanthan gum.

The apparent viscosity was measured at different shear velocities.

Flow or filterability test at a constant flow rate:

This test served to detect the phenomenon of clogging that may be produced during the injection of a dilute polymer in an oil reservoir and thus the suitability of the biopolymer solution for use in the assisted recovery of petroleum.

The principle of the test consisted of circulating dilute solutions at a constant flow rate through a calibrated filter. The pressure loss ($\Delta P$) generated at the terminals of the filter by the passage of the biopolymer solution characterize the filtering ability.

In order to take into account the conditions of application in the field, the solutions were tested at an identical viscosity (and not at equal concentrations).

The tests were carried out under the following conditions:
 (i) Temperature: 30° C.
 (ii) Flow rate: 22.5 ml/h
 (iii) Millipore filters with a diameter of 47 mm, pore diameters of 8 μm and 12 μm.

(iv) Preparation of the solutions: The wort was diluted in saline water (50 g/l NaCl and 5 g CaCl$_2$) such that the resultant solution had a viscosity of 35 mPa.s (measured on a Brookfield viscosimeter, UL adaptor, 30° C., shearing rate 7.3 s$^-$).
 (v) Pressure loss, $\Delta P$, was measured when 350 ml of the solution had been filtered. If the pressure exceeded 50 millibars, the number in parentheses indicates the volume of the solution filtered when the pressure reached 50 mb.

Injection test at constant pressure:

This test permits the determination of the injectability of dilute solutions of the biopolymer. The principle consists of circulating at a constant pressure the solutions through a calibrated filter. The flow volume characterizes injectability as a function of time.

The operation was carried out under the following conditions:
 (i) Millipore filters, 47 mm diameter; pore diameters of 5 μm to 12 μm,
 (ii) Pressure of 3 bars,
 (iii) Solution preparation: identical to that of the filterability test at constant pressure.

Viscosity 35 mPa.s (Brookfield—UL adaptor 30° C.—7.3 s$^-$)
 (iv) The time required for the passage of 1,000 ml of solution was noted. If the time exceeded 10 min, the value in parentheses indicates the volume of solution filtered.

The results are reported in Table III.

EXAMPLE 6:

To 1,700 g wort containing 15 g/kg xanthan gum, a mixture consisting of 38.1 g aliphatic hydrocarbon (Exsol D 100) and 7.7 g emulsifier (Cemulsol La 20 —Cemulsol PA 17, 50/50) were added, under agitation.

The emulsion was concentrated by ultrafiltration by means of an ultrafiltration module UFP2 equipped with an Iris 3038 membrane (marketed by the Prolabo Co.).

Initial pressure was 5 bars at the inlet, 3 bars at the outlet. Final pressure was 7 bars at the inlet, 3 bars at the outlet.

Ultrafiltration was discontinued when the concentration in xanthan gum reached 12% by weight, of the weight of the emulsion.

The apparent viscosity was measured as a function of the shear gradient. As a comparison, the initial wort was concentrated by ultrafiltration until the same value (12%) was attained. The results are reported in Table IV.

TABLE I

| | Viscosity in Pa.s | | |
| --- | --- | --- | --- |
| | 0.1 S$^{-1}$ | 1 S$^{-1}$ | 100 S$^{-1}$ |
| Emulsion at 23% xanthan gum according to the invention | 1350 | 280 | 19 |
| Wort at 7.6% xanthan gum | 3400 | 510 | 12 |
| Sol at 2% xanthan gum | 1500 | 200 | 4 |

TABLE II

| | Xanthan gum in solution % | Threshold stress in mPa. | Viscosity in mPa.s as a gradient velocity of | | |
| --- | --- | --- | --- | --- | --- |
| | | | 1 S$^{-1}$ | 10 S$^{-1}$ | 100 S$^{-1}$ |
| Example | 0.1 | 60 | 140 | 39 | 11 |

TABLE II-continued

| Xanthan gum in solution | Threshold stress in mPa. | Viscosity in mPa.s as a gradient velocity of | | |
|---|---|---|---|---|
| % | | 1 S$^{-1}$ | 10 S$^{-1}$ | 100 S$^{-1}$ |
| 3 Tapwater 0.3 | 950 | 1900 | 325 | 55 |
| 0.5 | 4285 | 6600 | 920 | 125 |
| 1 | 13800 | 18000 | 2300 | 290 |
| Initial 0.1 | 30 | 98 | 31 | 10 |
| wort 0.3 | 860 | 1640 | 290 | 52 |
| Tapwater 0.5 | 3215 | 5250 | 760 | 110 |
| 1 | 12020 | 16000 | 2100 | 260 |
| Example 0.1 | 78 | 175 | 46 | 12 |
| 3 Saline 0.3 | 1475 | 2800 | 440 | 72 |
| water NaCl 0.5 | 3930 | 6600 | 950 | 135 |
| g/l 1 | 14755 | 21500 | 2750 | 350 |

TABLE III

| | Rheology Viscosity in mPa · s* | | | Filterability at constant flow Δp in mb | | Injectability under 3 bars Time | | |
|---|---|---|---|---|---|---|---|---|
| | 3.7 s$^{-1}$ | 7.3 s$^{-1}$ | 14.7 s$^{-1}$ | 8 μm | 12 μm | 5 μm | 8 μm | 12 μm |
| Emulsion | 72.0 | 52.0 | 36.5 | 50 (175 ml) | 7.5 | 1' 45" | 1' 23" | 11" |
| Wort (Control) | 76.0 | 55.7 | 39.2 | 50 (88 ml) | 5.4 | 10' (360 ml) | 3' 25" | 13" |

*Viscosimeter Brookfield - adaptor UL - 30° C.

| | Viscosity in Pa.s* | | | |
|---|---|---|---|---|
| | 0.1 s$^{-1}$ | 1 s$^{-1}$ | 10 s$^{-1}$ | 100 s$^{-1}$ |
| Emulsion at 12% | 4,800 | 1,000 | 210 | 46 |
| Wort at 12% (control) | 13,000 | 1,800 | 290 | 46 |

*Rheomat 30 — System MSD

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. An oil-in-water emulsion which comprises (i) 40 to 99 parts by weight of an aqueous phase comprising from 10 to 60% by weight of a heteropolysaccharide biopolymer and from 40 to 90% by weight of water, (ii) 1 to 60 parts by weight of oil, and (ii) 1 to 40% by weight, with respect to the combined weight of the components (i) plus (ii), of at least one surface active agent, the oil-in-water emulsion containing greater than 15 up to 60% by weight of the heteropolysaccharide biopolymer.

2. The emulsion as defined in claim 1, comprising from 20 to 30 parts by weight of said heteropolysaccharide biopolymer, from 30 to 50 parts by weight of water, from 25 to 40 parts by weight of a hydrocarbon oil, and from 4 to 10 parts by weight of at least one surface active agent.

3. The emulsion as defined by claim 1, wherein said heteropolysaccharide biopolymer comprises xanthan gum.

4. The emulsion as defined by claim 3, wherein the oil comprises an aliphatic hydrocarbon.

5. The emulsion as defined by claim 1, further comprising a bactericide, an enzyme, or combination thereof.

6. The emulsion as defined by claim 1, wherein the surface active agent is at least one nonionic or anionic surface active agent.

7. A process for the preparation of a stable oil-in-water emulsion containing greater than 15 up to 60% by weight of a heteropolysaccharide biopolymer, comprising introducing water into an oil phase which comprises at least one surface active agent, and then gradually adding powdered heteropolysaccharide biopolymer thereto, under agitation to produce an oil-in-water emulsion which comprises (i) 40 to 99 parts by weight of an aqueous phase comprising from 10 to 60% by weight of a heteropolysaccharide biopolymer and from 40 to 90% by water, (ii) 1 to 60 parts by weight of oil, and (iii) 1 to 40% by weight, with respect to the combined weight of the components (i) plus (ii), of at least one surface active agent.

8. A process for the preparation of a stable oil-in-water emulsion containing greater than 15 to 60% by weight of a heteropolysaccharide biopolymer, comprising admixing at least one surface active agent with an oil phase, dispersing powdered heteropolysaccharide biopolymer in said oil phase admixture, and then adding water thereto, under agitation to produce an oil-in-water emulsion which comprises (i) 40 to 99 parts by weight of an aqueous phase comprising from 10 to 60% by weight of a heteropolysaccharide biopolymer and from 40 to 90% by water, (ii) 1 to 60 parts by weight of oil, and (iii) 1 40% by weight, with respect to the combined weight of the components (i) plus (ii), of at least one surface active agent.

9. A process for the preparation of a stable oil-in-water emulsion containing greater than 15 to 60% by weight of a heteropolysaccharide biopolymer, comprising (a) formulating an oil-in-water emulsion by adding an oil and at least one surface active agent to an aqueous solution which comprises from about 1 to 18% by weight of a heteropolysaccharide biopolymer, the ratio of oil to water ranging from 1/100 to 2/1, and (b) then concentrating the emulsion to produce an oil-in-water emulsion which comprises (i) 40 to 99 parts by weight of an aqueous phase comprising from 10 to 60% by weight of a heteropolysaccharide biopolymer and from 40 to 90% by water, (ii) 1 to 60 parts by weight of oil, and (iii) 1 to 40% by weight, with respect to the combined weight of the components (i) plus (ii), of at least one surface active agent.

10. The process as defined by claim 9, said aqueous biopolymer solution comprising a fermentation wort containing from 15 to 180 g/liter of said biopolymer.

11. The process as defined by claim 10, said fermentation wort having been concentrated by ultrafiltration.

12. The process as defined by claim 9, comprising concentrating said emulsion which results by ultrafiltration.

13. The process as defined by claim 9, said concentration step (b) comprising ultrafiltration, followed by evaporation or distillation.

14. The process as defined by claim 10, said fermentation wort having been preliminarily clarified.

15. A process for the preparation of a stable oil-in-water emulsion containing greater than 15 up to 60% by weight of a heteropolysaccharide biopolymer, comprising (a) formulating an oil-in-water emulsion by adding an oil and at least one surface active agent to an aqueous fermentation wort containing from 15 to 180 g/liter of said heteropolysaccharide biopolymer, the ratio to oil to water ranging from 1/100 to 2/1, and (b) then concentrating the emulsion to produce an oil-in-water emulsion which comprises (i) 40 to 99 parts by weight of an aqueous phase comprising from 10 to 60% by weight of a heteropolysaccharide biopolymer and from 40 to 90% by water, (ii) 1 to 60 parts by weight of oil, and (iii) 1 to 40% by weight, with respect to the combined weight of the components (i) plus (ii), of at least one surface active agent.

16. The process as defined by claim 15, said concentration step (b) comprising ultrafiltration, followed by evaporation or distillation.

* * * * *